US012641338B2

(12) United States Patent
Kim et al.

(10) Patent No.: US 12,641,338 B2
(45) Date of Patent: May 26, 2026

(54) METHOD FOR CORRECTING SHAKING DURING SHOOTING AND ELECTRONIC DEVICE THEREFOR

(71) Applicant: Samsung Electronics Co., Ltd., Suwon-si (KR)

(72) Inventors: Yeonhak Kim, Suwon-si (KR); Donghun Yu, Suwon-si (KR); Sewon Kim, Suwon-si (KR); Kyeonguk Lee, Suwon-si (KR); Kihuk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 218 days.

(21) Appl. No.: 18/617,178

(22) Filed: Mar. 26, 2024

(65) Prior Publication Data
US 2024/0236491 A1      Jul. 11, 2024

Related U.S. Application Data

(63) Continuation of application No. PCT/KR2022/012903, filed on Aug. 30, 2022.

(30) Foreign Application Priority Data
Oct. 29, 2021      (KR) ........................ 10-2021-0146847

(51) Int. Cl.
H04N 23/68 (2023.01)
G03B 5/04 (2021.01)
(Continued)

(52) U.S. Cl.
CPC ............. H04N 23/687 (2023.01); G03B 5/04 (2013.01); G03B 13/36 (2013.01); H04N 23/61 (2023.01);
(Continued)

(58) Field of Classification Search
CPC ...... H04N 23/687; H04N 23/61; H04N 23/67; H04N 23/6812; H04N 5/907; H04N 23/54;
(Continued)

(56) References Cited

U.S. PATENT DOCUMENTS 10,382,687 B1 *   8/2019   Patel ................... G02B 27/646
10,613,342 B2     4/2020   Kasamatsu
(Continued)

FOREIGN PATENT DOCUMENTS

CN        110830707 A        2/2020
JP        2009145852 A       7/2009
(Continued)

OTHER PUBLICATIONS

International Search Report for PCT/KR2022/012903 mailed Dec. 6, 2022, 6 pages.
(Continued)

*Primary Examiner* — Shahbaz Nazrul
(74) *Attorney, Agent, or Firm* — Nixon & Vanderhye, P.C.

(57) ABSTRACT
An electronic device according to an embodiment comprises: a lens assembly including one or more lenses aligned along an optical axis; an auto focus (AF) module comprising circuitry configured to move the lens assembly in the direction of the optical axis; an optical image stabilization (OIS) module comprising circuitry configured to move the lens assembly in a plane perpendicular to the optical axis, wherein the OIS module includes a unit correction section based on a driving range of the OIS module, a movement range of the lens assembly in the plane according to driving of the AF module, and a resolution of the OIS module; an image sensor configured to acquire light passing through the lens assembly; a motion sensor; and at least one processor,
(Continued)

ELECTRONIC DEVICE (100)

OIS MODULE (130)    OIS DRIVING INSPECTOR (140)

LENS ASSEMBLY (120)    AF MODULE (150)

IMAGE SENSOR (160)    CAMERA MODULE (180)

MOTION SENSOR (170)

DRIVING CIRCUIT (103)

SENSOR CIRCUIT (105)    CONTROL CIRCUIT (101)    OIS DRIVING INSPECTOR (140)

FIRST MEMORY (107)

OIS MODULE (130)

PROCESSOR (110)

SECOND MEMORY (190)    DISPLAY (195)

comprising processing circuitry, electrically connected to the AF module, the OIS module, the image sensor, and the motion sensor, wherein at least one processor, individually and/or collectively, may be configured to: detect a motion of the electronic device using the motion sensor; drive the image sensor to recognize a subject; control the AF module so that the lens assembly moves to a first position on the optical axis based on the position of the subject; and control the OIS module to perform OIS based on the movement of the electronic device, the first position of the lens assembly, and the unit correction section of the OIS module.

15 Claims, 10 Drawing Sheets

(51) Int. Cl.

| | | |
|---|---|---|
| *G03B 13/36* | (2021.01) | |
| *H04N 23/61* | (2023.01) | |
| *H04N 23/67* | (2023.01) | |

(52) U.S. Cl.
CPC ......... *H04N 23/67* (2023.01); *H04N 23/6812* (2023.01); *G03B 2205/0015* (2013.01)

(58) Field of Classification Search
CPC .......... H04N 23/55; G03B 5/04; G03B 13/36; G03B 2205/0015
See application file for complete search history.

(56) References Cited

U.S. PATENT DOCUMENTS

| | | | |
|---|---|---|---|
| 12,063,441 B1 * | 8/2024 | Dhanda | ................ H04N 23/687 |
| 2006/0056831 A1 | 3/2006 | Horio | |

| | | | |
|---|---|---|---|
| 2012/0026347 A1 | 2/2012 | Hong | |
| 2015/0237257 A1 | 8/2015 | Kang | |
| 2016/0327806 A1 | 11/2016 | Kasamatsu | |
| 2017/0295322 A1 | 10/2017 | Shibata | |
| 2018/0041709 A1 * | 2/2018 | Konttori | ................ H04N 23/57 |
| 2018/0184005 A1 | 6/2018 | Morotomi | |
| 2018/0367714 A1 | 12/2018 | Im | |
| 2020/0124828 A1 * | 4/2020 | Kang | ..................... H04N 23/67 |
| 2020/0174219 A1 | 6/2020 | Sugawara | |
| 2020/0241387 A1 | 7/2020 | Seo | |
| 2020/0404182 A1 | 12/2020 | Song | |
| 2021/0120159 A1 | 4/2021 | Yang | |
| 2022/0286611 A1 * | 9/2022 | Tsairi | ................. H04N 23/6812 |
| 2023/0254561 A1 | 8/2023 | Seo | |
| 2024/0107144 A1 * | 3/2024 | Miller | .................... H04N 23/55 |

FOREIGN PATENT DOCUMENTS

| | | |
|---|---|---|
| JP | 2017191140 A | 10/2017 |
| JP | 2020086284 A | 6/2020 |
| KR | 20120011239 A | 2/2012 |
| KR | 20150051098 A | 5/2015 |
| KR | 20150096902 A | 8/2015 |
| KR | 20180076285 A | 7/2018 |
| KR | 20190088644 A | 7/2019 |
| KR | 20190115122 A | 10/2019 |
| KR | 102067069 B1 | 1/2020 |
| KR | 20200093997 A | 8/2020 |
| KR | 20210129608 A | 10/2021 |

OTHER PUBLICATIONS

Written Opinion of the ISA for PCT/KR2022/012903 mailed Dec. 6, 2022, 4 pages.
Korean Office Action issued Feb. 10, 2026 in corresponding Korean Patent Application No. 10-2021-0146847.

* cited by examiner

START

210
DETECT MOTION OF ELECTRONIC DEVICE
BY USING MOTION SENSOR

220
DRIVE IMAGE SENSOR AND RECOGNIZE SUBJECT

230
CONTROL AF MODULE TO MOVE LENS ASSEMBLY
TO FIRST POSITION ON OPTICAL AXIS, BASED
ON POSITION OF SUBJECT

240
CONTROL OIS MODULE TO PERFORM OIS,
BASED ON MOTION OF ELECTRONIC DEVICE,
FIRST POSITION OF LENS ASSEMBLY,
AND UNIT CORRECTION SECTION OF OIS MODULE

END

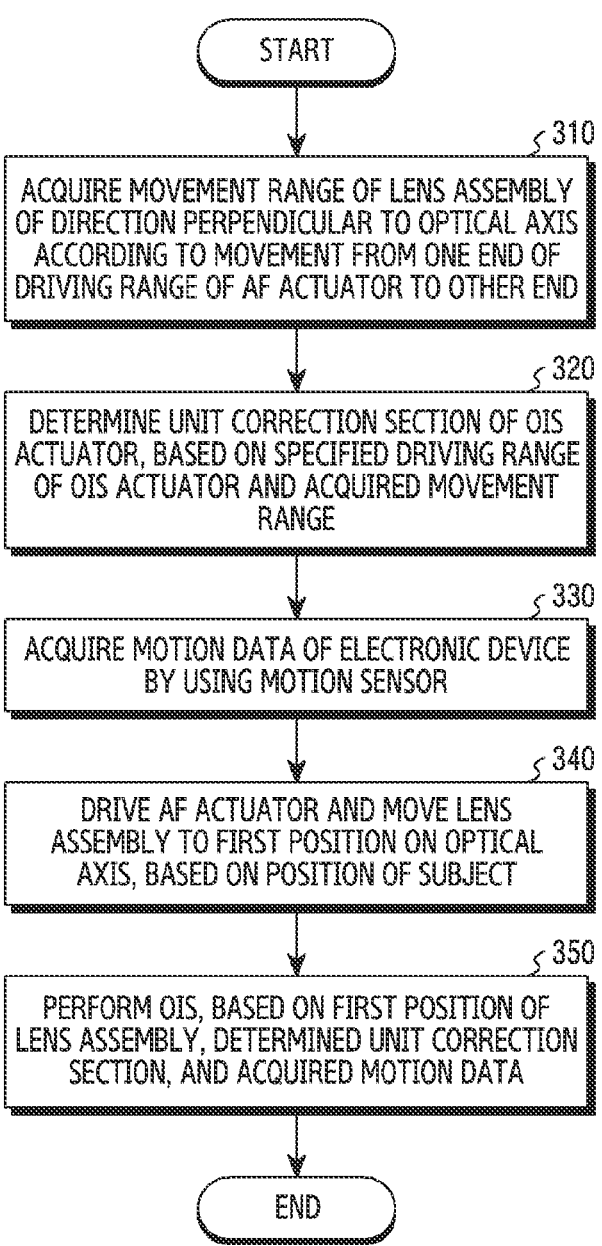

START

310

ACQUIRE MOVEMENT RANGE OF LENS ASSEMBLY OF DIRECTION PERPENDICULAR TO OPTICAL AXIS ACCORDING TO MOVEMENT FROM ONE END OF DRIVING RANGE OF AF ACTUATOR TO OTHER END

320

DETERMINE UNIT CORRECTION SECTION OF OIS ACTUATOR, BASED ON SPECIFIED DRIVING RANGE OF OIS ACTUATOR AND ACQUIRED MOVEMENT RANGE

330

ACQUIRE MOTION DATA OF ELECTRONIC DEVICE BY USING MOTION SENSOR

340

DRIVE AF ACTUATOR AND MOVE LENS ASSEMBLY TO FIRST POSITION ON OPTICAL AXIS, BASED ON POSITION OF SUBJECT

350

PERFORM OIS, BASED ON FIRST POSITION OF LENS ASSEMBLY, DETERMINED UNIT CORRECTION SECTION, AND ACQUIRED MOTION DATA

END

FIG.3

METHOD FOR CORRECTING SHAKING DURING SHOOTING AND ELECTRONIC DEVICE THEREFOR

CROSS-REFERENCE TO RELATED APPLICATIONS

This application is a continuation of International Application No. PCT/KR2022/012903 designating the United States, filed on Aug. 30, 2022, in the Korean Intellectual Property Receiving Office and claiming priority to Korean Patent Application No. 10-2021-0146847, filed on Oct. 29, 2021, in the Korean Intellectual Property Office, the disclosures of each of which are incorporated by reference herein in their entireties.

BACKGROUND

Field

The disclosure relates to a method for correcting shaking during camera shooting and an electronic device therefor.

Description of Related Art

Among camera functions, a shaking correction function is an essential and important function for acquiring clear photos. Among shaking correction methods, optical image stabilization (OIS) is a method of reducing shaking by moving a lens or a sensor. To correct a position of the lens varying according to auto focus (AF) or to correct shaking of an electronic device, an OIS actuator performing the optical image stabilization compensates for errors by moving the lens by an occurring position error in a direction substantially perpendicular to an optical axis.

Also, the OIS actuator required to perform the optical image stabilization generally includes a ball bearing type and a wire type. Among these, the ball bearing type has an advantage of a larger range of a shaking correction angle, a small current consumption, and a great resistance to shock, compared to the wire type.

Meanwhile, when shaking correction is performed using the ball bearing type OIS actuator, as a section in which the OIS actuator cannot be driven in a control manner is generated, a driving impossible section can be generated in a driving section of mechanically designed OIS. This can cause a drawback of limiting an OIS correction angle or having to increase the size of a camera module.

SUMMARY

Embodiments of the disclosure may provide a device and method of expanding an OIS correction section and performing shaking correction.

An electronic device according to an example embodiment may include: a lens assembly including at least one lens aligned along an optical axis, an auto focus (AF) module comprising circuitry configured to move the lens assembly in the direction of the optical axis, an optical image stabilization (OIS) module comprising circuitry configured to move the lens assembly in a plane perpendicular to the optical axis, the OIS module having a unit correction section based on a driving range of the OIS module, a movement range of the lens assembly in the plane being dependent on driving of the AF module, and a resolution of the OIS module, an image sensor configured to acquire light passing through the lens assembly, a motion sensor, and at least one processor, comprising processing circuitry, electrically connected to the AF module, the OIS module, the image sensor, and the motion sensor. At least one processor, individually and/or collectively, may be configured to: detect a motion of the electronic device using the motion sensor, drive the image sensor and recognize a subject, control the AF module to move the lens assembly to a first position on the optical axis, based on a position of the subject, and control the OIS module to perform OIS, based on the motion of the electronic device, the first position of the lens assembly, and the unit correction section of the OIS module.

A method of operating an electronic device according to an example embodiment may include: detecting a motion of the electronic device using a motion sensor, driving an image sensor and recognizing a subject, controlling an auto focus (AF) module to move a lens assembly including at least one lens along an optical axis to a first position on the optical axis, based on a position of the subject, and performing optical image stabilization (OIS), based on the motion of the electronic device, the first position of the lens assembly, and a unit correction section of an OIS module, wherein, the OIS module may move the lens assembly in a plane perpendicular to the optical axis, and include a unit correction section based on a driving range of the OIS module, a movement range of the lens assembly in the plane dependent on driving of the AF module, and a resolution of the OIS module.

An electronic device according to an example embodiment may include: a lens assembly including at least one lens aligned along an optical axis, an auto focus (AF) actuator configured to move the lens assembly in the direction of the optical axis, an optical image stabilization (OIS) actuator configured to move the lens assembly in a direction perpendicular to the optical axis within a specified driving range, a motion sensor, and at least one processor, comprising processing circuitry, electrically connected to the AF actuator, the OIS actuator, and the motion sensor, wherein at least one processor, individually and/or collectively, may be configured to: acquire a movement range of the lens assembly of a direction perpendicular to the optical axis according to the movement of the AF actuator from one end to another end of a driving range of the AF actuator, determine a unit correction section of the OIS actuator, based on the specified driving range of the OIS actuator and the acquired movement range, acquire motion data of the electronic device using the motion sensor, drive the AF actuator and move the lens assembly to a first position on the optical axis, based on a position of a subject, and perform OIS, based on the first position of the lens assembly, the determined unit correction section, and the acquired motion data.

According to various example embodiments of the disclosure, by expanding an OIS correction section, a shaking correction function may be improved without an increase of the size of a camera module.

In addition, various effects directly or indirectly identified through this disclosure may be presented.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3 is a flowchart illustrating an example operation of performing OIS, based on determining a unit correction section of an OIS module, in an electronic device according to various embodiments;

In relation to the description of the drawings, identical or similar reference numerals may be used for identical or similar components.

DETAILED DESCRIPTION

Various example embodiments of the disclosure are described below with reference to the accompanying drawings. However, this is not intended to limit the disclosure to specific embodiments, and should be understood as including various modifications, equivalents, and/or alternatives of the embodiments of the disclosure.

Figure 1:
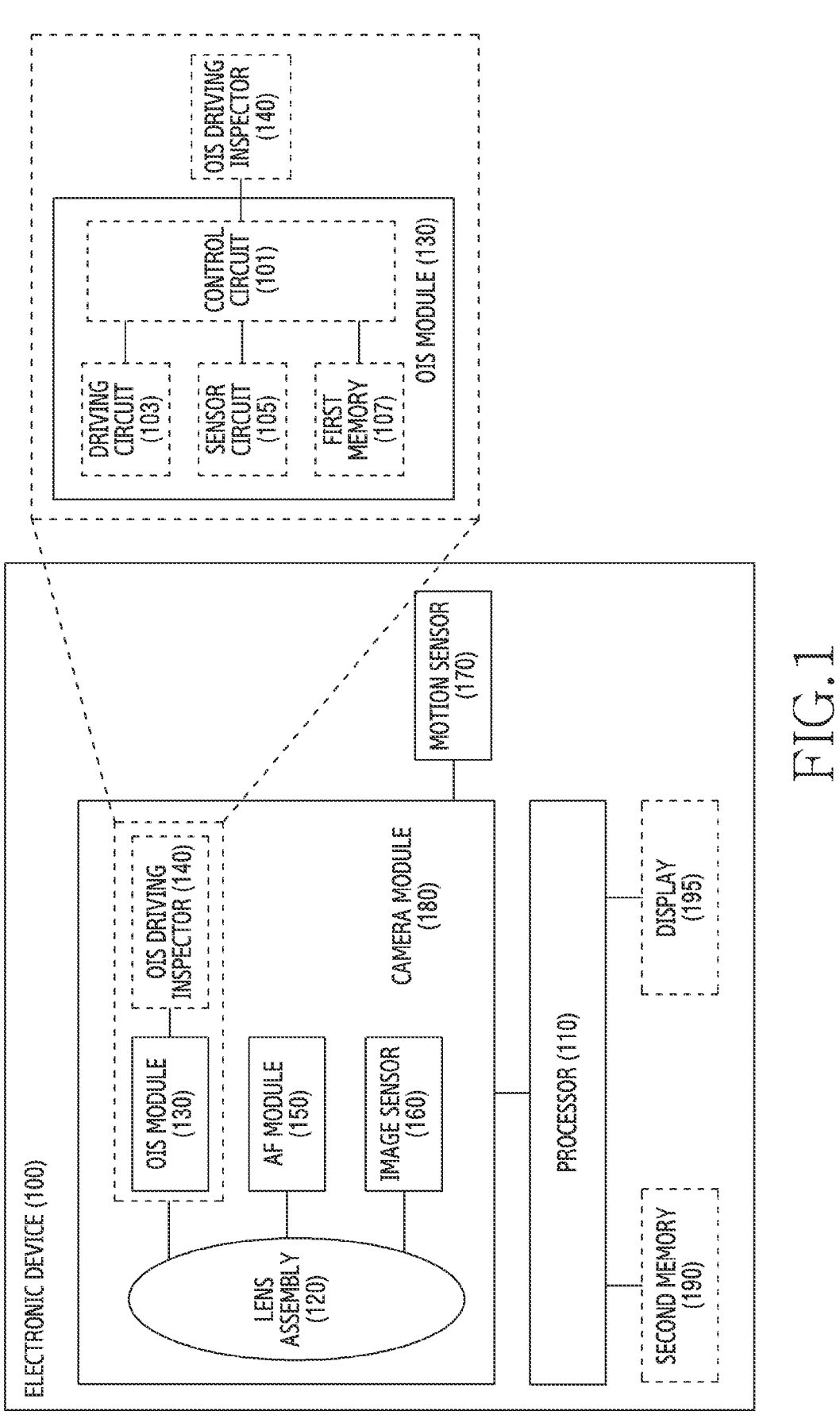
FIG. 1 is a block diagram illustrating an example configuration of an electronic device according to various embodiments.

FIG. 1 is a block diagram illustrating an example configuration of an electronic device according to various embodiments.

Figure 9:
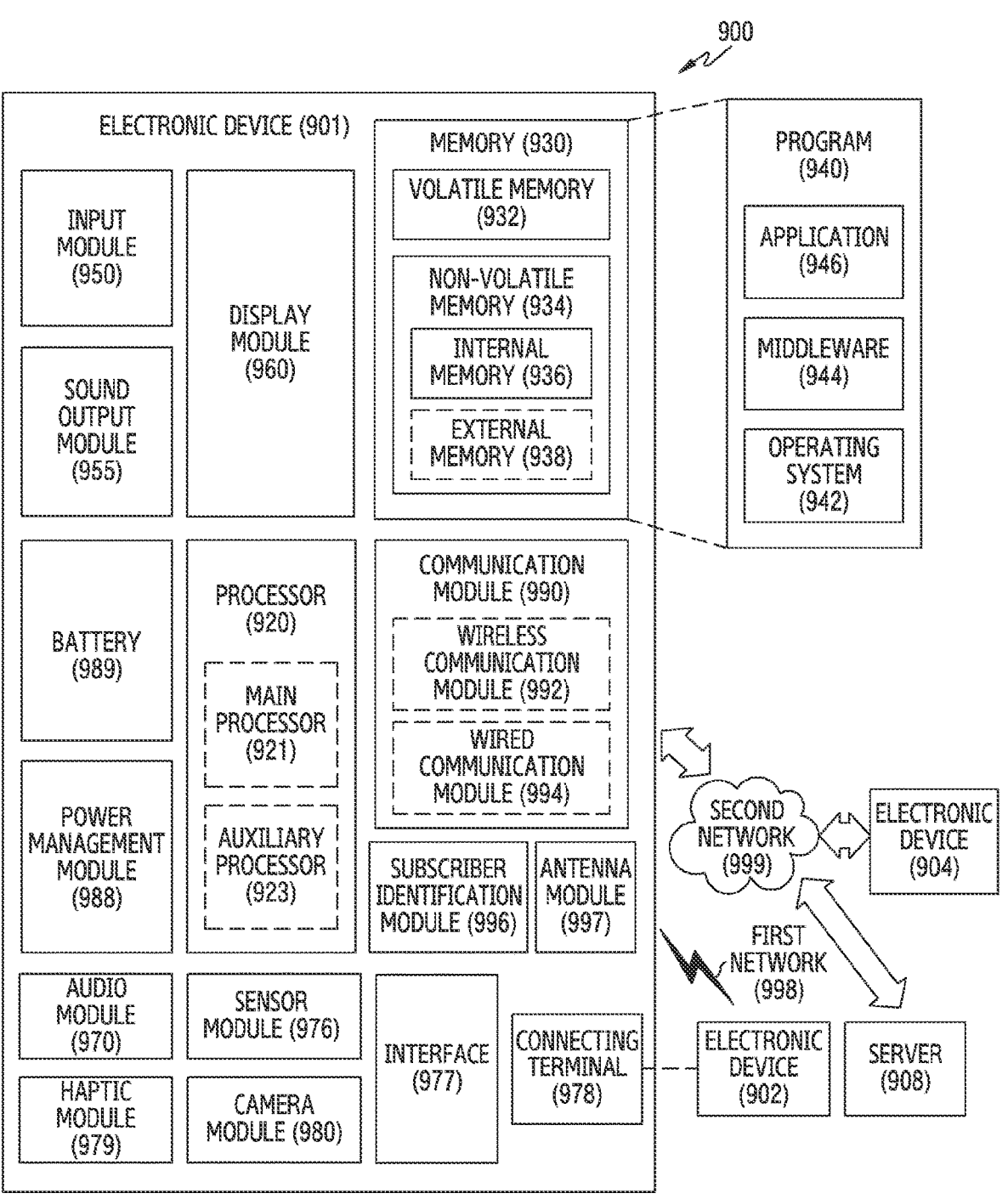
FIG. 9 is a block diagram illustrating an example electronic device in a network environment according to various embodiments.

Referring to FIG. 1, the electronic device 100 may include a processor (e.g., including processing circuitry) 110 (e.g., processor 920 of FIG. 9), a motion sensor 170 (e.g., sensor module 976 of FIG. 9), a camera module (e.g., including a camera) 180 (e.g., camera module 980 of FIGS. 9 and 10), a second memory 190 (e.g., memory 930 of FIG. 9), and a display 195 (e.g., display module 960 of FIG. 9). According to an embodiment, the camera module 180 may include a lens assembly (e.g., including at least one lens) 120, an OIS module (e.g., including circuitry) 130, an OIS driving inspector (e.g., including circuitry and/or executable program instructions) 140, an AF module (e.g., including circuitry) 150, and an image sensor 160. According to an embodiment, the OIS module 130 may include a control circuit 101, a driving circuit 103, a sensor circuit 105, and a first memory 107. In various embodiments, the electronic device 100 may include additional components in addition to the components shown in FIG. 1, or may omit at least one of the components shown in FIG. 1. According to an embodiment, the electronic device 100 may include all or part of a construction and/or function of an electronic device 901 of FIG. 9.

According to an embodiment, the processor 110 may be understood as including at least one processor. The processor 110 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. According to an embodiment, the processor 110 may execute operations or data processing related to control and/or communication of at least one other component of the electronic device 100 using instructions stored in the second memory 190. According to an embodiment, the processor 110 may include at least one of a central processing unit (CPU), a graphics processing unit (GPU), a micro controller unit (MCU), a sensor hub, a supplementary processor, a communication processor, an application processor, an application specific integrated circuit (ASIC), and a field programmable gate arrays (FPGA), and may have a plurality of cores.

According to an embodiment, the electronic device 100 may include the motion sensor 170. According to an embodiment, the processor 110 may detect a motion of the electronic device 100 using the motion sensor 170. For example, the processor 110 may detect a motion direction and/or motion degree of the electronic device 100 using a gyro sensor. According to an embodiment, the motion sensor 170 may present motion data corresponding to the motion of the electronic device 100, to the processor 110.

In an embodiment, the motion sensor 170 may include at least one of an acceleration sensor, the gyro sensor (gyroscope), a magnetic sensor, or a Hall sensor. For example, the acceleration sensor may measure an acceleration, which acts on three axes (e.g., X-axis, Y-axis, or Z-axis), of the electronic device 100. For another example, the gyro sensor may measure a rotation angle or tilt of the electronic device 100 with respect to the three axes (e.g., X-axis, Y-axis, or Z-axis). However, the above sensors are examples, and the motion sensor 170 may further include at least one other type of sensor.

According to an embodiment, the camera module 180 may acquire image frames under the control of the processor 110. In an embodiment, the camera module 180 may acquire the image frames while performing an OIS function by the OIS module 130. In an embodiment, the camera module 180 may present the image frames acquired while performing the OIS function, to the processor 110.

According to an embodiment, the camera module 180 may include the lens assembly 120, the OIS module 130, the OIS driving inspector 140, the AF module 150, and the image sensor 160. In an embodiment, the image sensor 160 may be understood as an image sensor 1030 shown in FIG. 10.

According to an embodiment, the camera module 180 may use a lens shift method of moving the lens assembly 120 through the OIS function. According to an embodiment, the OIS module 130 may include the control circuit 101, the driving circuit 103, the sensor circuit 105, and the first memory 107.

According to an embodiment, the control circuit 101 may perform OIS Hall calibration and identify an OIS code margin corresponding to an AF error amount. According to an embodiment, the control circuit 101 may detect a moved position of the lens assembly 120 through the sensor circuit 105. For example, the control circuit 101 may acquire a Hall voltage provided from a movement of the lens assembly 120 through the Hall sensor, and identify a position of the lens assembly 120 through the Hall sensor.

According to an embodiment, the control circuit 101 may move the lens assembly 120 through the driving circuit 103. For example, the control circuit 101 may control the driving circuit 103 to adjust the position of the lens assembly 120, based on the position of the lens assembly 120 acquired through the Hall sensor. According to an embodiment, the control circuit 101 may determine an OIS correction section, and store data about the determined OIS correction section in the first memory 107. According to an embodiment, the OIS driving inspector 140 may detect an error amount that occurs when AF is driven by the AF module 150, and transfer data about the detected error amount to the control circuit 101.

According to an embodiment, the second memory 190 may refer, for example, to one or more memory sets. According to an embodiment, the second memory 190 may store data and/or commands received from or provided by other components (e.g., processor 110 and display 195).

According to an embodiment, the display 195 may convert an image signal, a data signal, an on screen display (OSD) signal, a control signal, etc. processed by the processor 110, and provide a driving signal. According to an embodiment, the display 195 may be implemented, for example, and without limitation, as a plasma display panel (PDP), a liquid crystal display (LCD), an organic light emitting diode (OLED), a flexible display, etc., and may also be implemented as a three-dimensional (3D) display. According to an embodiment, the display 195 may include a touch screen and be used as an input module in addition to an output device.

Figure 2:
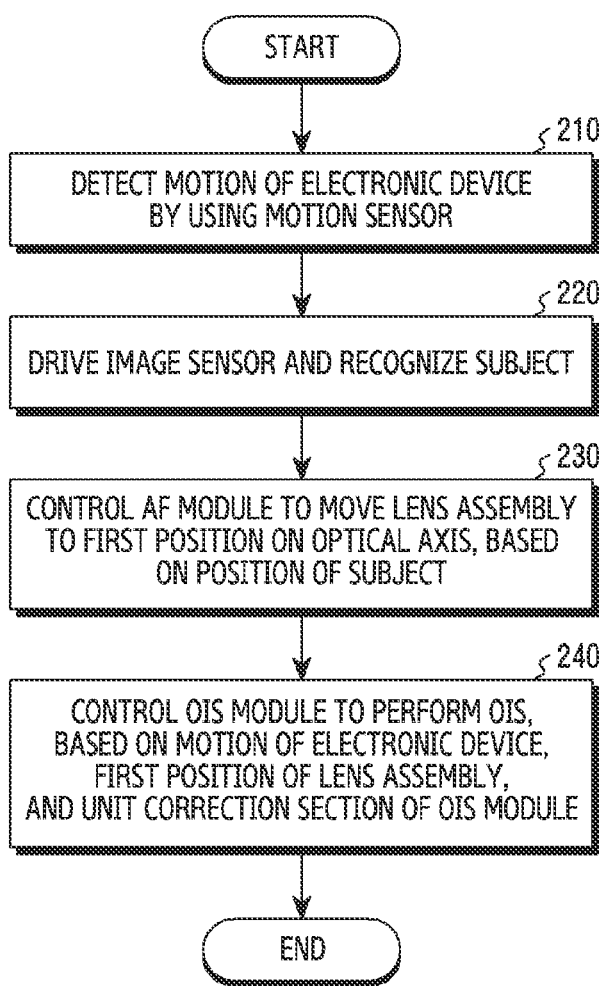
FIG. 2 is a flowchart illustrating an example operation of performing OIS, based on a unit correction section of an OIS module, in an electronic device according to various embodiments.

FIG. 2 is a flowchart illustrating an example operation of performing OIS, based on a unit correction section of an OIS module, in an electronic device (e.g., electronic device 100 of FIG. 1) according to various embodiments.

Referring to FIG. 2, in operation 210, a processor (e.g., processor 110 of FIG. 1) of an embodiment may detect a motion of the electronic device 100 using a motion sensor (e.g., motion sensor 170 of FIG. 1). According to an embodiment, the processor 110 may acquire motion data corresponding to the motion of the electronic device 100 using the motion sensor 170. For example, the motion sensor 170 may include at least one of an acceleration sensor, a gyro sensor (gyroscope), a magnetic sensor, or a Hall sensor.

According to an embodiment, the processor 110 may measure an acceleration, which acts on three axes (e.g., X-axis, Y-axis, or Z-axis), of the electronic device 100 from the acceleration sensor. The gyro sensor may measure a rotation angle or tilt of the electronic device 100 with respect to the three axes (e.g., X-axis, Y-axis, or Z-axis). For example, the processor 110 may acquire information about an angle at which the electronic device 100 is shaken from the gyro sensor. According to an embodiment, the processor

110 may detect a moved position of a lens assembly (e.g., lens assembly 120 of FIG. 1) through the Hall sensor.

According to an embodiment, in operation 220, the processor 110 may drive an image sensor (e.g., image sensor 160 of FIG. 1) and recognize a subject. According to an embodiment, the processor 110 may recognize (or identify) at least one object in at least one image frame that the image sensor 160 acquires based on light passing through the lens assembly 120. According to an embodiment, the processor 110 may identify a position, and/or a distance from the electronic device 100, of the subject included in the at least one image frame acquired through the image sensor 160.

According to an embodiment, in operation 230, the processor 110 may control an AF module (e.g., AF module 150 of FIG. 1) to move the lens assembly 120 to a first position on an optical axis, based on the position of the subject.

According to an embodiment, to perform auto focus based on the position of the subject, the processor 110 may drive an AF actuator disposed on a plane substantially parallel to the optical axis and move the lens assembly 120 to the first position on the optical axis. According to an embodiment, the processor 110 may drive the AF actuator and move the lens assembly 120 to an on-focus region wherein the subject is in an on-focus state.

According to an embodiment, in operation 240, the processor 110 may control the OIS module to perform OIS, based on the motion of the electronic device 100, the first position of the lens assembly 120, and a unit correction section of the OIS module (e.g., OIS module 130 of FIG. 1). According to an embodiment, an OIS actuator (e.g., driving circuit 103 of FIG. 1) may be disposed on a plane substantially perpendicular to the optical axis, and the OIS module 130 may move the lens assembly 120 in the plane substantially perpendicular to the optical axis.

According to an embodiment, the OIS module 130 may have a unit correction section (e.g., including various circuitry and/or executable program instructions) that is based on a driving range of the OIS module 130, a movement range of the lens assembly 120 in the plane substantially perpendicular to the optical axis dependent on driving of the AF module 150, and a resolution of the OIS module 130. According to an embodiment, when the resolution of the OIS module 130 is N bits, the unit correction section may be set as a value obtained by dividing a sum of the driving range and the movement range by $2^N$. For example, when the resolution of the OIS module 130 is 12 bits, the unit correction section may be set as a value obtained by dividing the sum of the driving range and the movement range by 4096.

According to an embodiment, the processor 110 may store the unit correction section of the OIS module 130 in a memory (e.g., first memory 107 of FIG. 1) of the OIS module 130. According to an embodiment, the processor 110 may perform OIS, based on the unit correction section of the OIS module 130 stored in the first memory 107.

According to the above-described example embodiment, the electronic device 100 may determine a unit correction section of an OIS module, based on a resolution of an OIS module, thereby performing an OIS function even within a driving impossible range caused by physical limitations and expanding an OIS correction range.

FIG. 3 is a flowchart illustrating an example operation of performing OIS, based on determining a unit correction section of an OIS module, in an electronic device (e.g., electronic device 100 of FIG. 1) according to various embodiments. In the following embodiment, each operation may be performed sequentially, but is not necessarily performed sequentially. For example, the order of each operation may be also changed, and at least two operations may be also performed in parallel.

Referring to FIG. 3, in operation 310, as an AF actuator moves from one end of an AF actuator driving range to the other end, the processor 110 of an embodiment may acquire a movement range (or movement amount) of a lens assembly (e.g., lens assembly 120 of FIG. 1) of a direction perpendicular to an optical axis. According to an embodiment, the processor 110 may acquire the movement amount of the lens assembly 120, which occurs while the AF actuator moves the lens assembly 120 in a direction parallel to the optical axis, of the direction perpendicular to the optical axis. In this disclosure, the movement amount of the lens assembly 120, which occurs as the AF actuator moves from the one end of the AF actuator driving range to the other end, of the direction perpendicular to the optical axis may be referred to as an AF driving error amount. Also, in this disclosure, a value obtained by converting the AF driving error amount into a digital code may be referred to as a code margin.

According to an embodiment, in operation 320, the processor 110 may determine a unit correction section of an OIS actuator, based on a specified driving range of the OIS actuator (e.g., driving circuit 103 of FIG. 1) and the acquired movement range of the lens assembly 120. For example, the specified driving range of the OIS actuator may be understood as a maximum driving range over which the electronic device 100 may perform OIS. According to an embodiment, the processor 110 may store, in a first memory (e.g., first memory 107 of FIG. 1), information about the unit correction section that is determined using the specified driving range of the OIS actuator and the movement range of the lens assembly 120, which is dependent on the movement of the AF actuator from the one end of the AF actuator driving range to the other end, of the direction perpendicular to the optical axis.

According to an embodiment, the processor 110 may determine the unit correction section of the OIS actuator using a code margin corresponding to the specified driving range of the OIS actuator and the acquired movement range of the lens assembly 120. A more detailed description of determining the unit correction section of the OIS actuator using the code margin will be provided below with reference to FIG. 4.

According to an embodiment, in operation 330, the processor 110 may acquire motion data of the electronic device 100 using a motion sensor (e.g., motion sensor 170 of FIG. 1). According to an embodiment, the processor 110 may detect a motion (or shaking) of the electronic device 100 through the motion sensor 170. According to an embodiment, the motion sensor 170 may present motion data corresponding to the motion of the electronic device 100, to the processor 110. For example, the motion sensor 170 may include at least one of an acceleration sensor, a gyro sensor (gyroscope), a magnetic sensor, or a Hall sensor. Also, for example, the motion data may include an acceleration, which acts on three axes (e.g., X-axis, Y-axis, or Z-axis), of the electronic device 100, or a rotation angle or tilt of the electronic device 100 with respect to the three axes (e.g., X-axis, Y-axis, or Z-axis).

According to an embodiment, in operation 340, the processor 110 may drive the AF actuator, based on the position of the subject, and move the lens assembly 120 to a first position on the optical axis. According to an embodiment, the processor 110 may drive the AF actuator and change a position of the lens assembly 120, to perform auto focus based on the position of the subject.

According to an embodiment, the AF actuator may be disposed on a plane parallel to the optical axis, and may move the lens assembly 120 to the first position on the optical axis, to perform auto focus. According to an embodiment, the processor 110 may drive the AF actuator and move the lens assembly 120 to an on-focus region wherein the subject is in an on-focus or in-focus state.

According to an embodiment, in operation 350, the processor 110 may perform OIS, based on the first position of the lens assembly 120, the determined unit correction section, and the acquired motion data. According to an embodiment, the processor 110 may perform OIS, based on the unit correction section stored in the first memory 107.

According to the above-described example embodiment, the electronic device 100 of the disclosure may determine a unit correction section of an OIS actuator and perform OIS, thereby expanding a correction range (or correction angle) of the OIS actuator without an increase of the size of a camera module.

Figure 4:
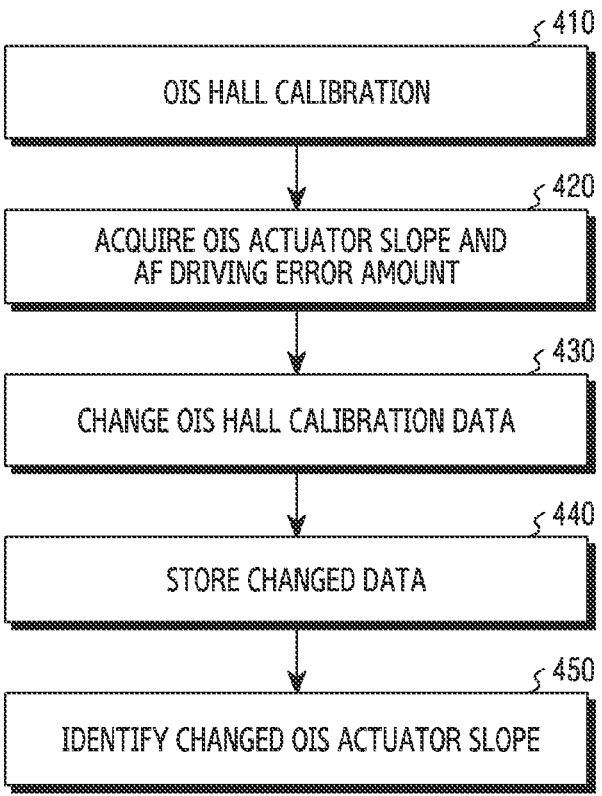
FIG. 4 is a flowchart illustrating an example operation of acquiring data required to determine a unit correction section of an OIS module in an electronic device according to various embodiments.

FIG. 4 is a flowchart illustrating an example operation of acquiring data required to determine a unit correction section of an OIS module in an electronic device (e.g., electronic device 100 of FIG. 1) according to various embodiments.

Referring to FIG. 4, in operation 410, a processor (e.g., processor 110 of FIG. 1) of an embodiment may perform OIS Hall calibration. According to an embodiment, the processor 110 may perform the OIS Hall calibration, by matching, with a digital code of the OIS module, a minimum value and maximum value of a Hall voltage that is detected when a lens moves from one end of an AF actuator driving range to the other end by an AF actuator. For example, when a resolution of the OIS module is 12 bits, the digital code may have a range of 0 to 4095, a minimum value of a Hall sensor may be matched with the digital code of 0, and a maximum value of the Hall sensor may be matched with the digital code of 4095.

According to an embodiment, in operation 420, the processor 110 may acquire an OIS actuator slope and an AF driving error amount.

In the disclosure, the OIS actuator slope may refer, for example, to a value obtained by dividing a movement amount of the lens by a digital code change amount. In the disclosure, the AF driving error amount may refer, for example, to a movement amount of the lens, which occurs as an AF actuator moves from one end of an AF actuator driving range to the other end, of a direction perpendicular to an optical axis. In the disclosure, a value obtained by converting the AF driving error amount into a digital code may be referred to as code margin.

According to an embodiment, after the OIS Hall calibration, the processor 110 may measure the OIS actuator slope and the AF driving error amount occurring at AF driving, through an OIS driving inspector (e.g., OIS driving inspector 140 of FIG. 1). The measured AF driving error amount is converted into a digital code by the OIS actuator slope, and at this time, the measured AF driving error amount corresponds to a code margin value required at OIS driving. The code margin value is set as a value greater than a center value of an OIS digital code range.

According to an embodiment, in operation 430, the processor 110 may change OIS Hall calibration data. According to an embodiment, the processor 110 may change existing OIS Hall calibration data using the code margin. A description of changing the OIS Hall calibration data using the code margin will be made in greater detail below with reference to FIG. 6.

According to an embodiment, in operation 440, the processor 110 may store the changed data. According to an embodiment, the processor 110 may store the changed data in a memory (e.g., first memory 107 of FIG. 1) within the OIS module (e.g., OIS module 130 of FIG. 1). Also, according to an embodiment, the processor 110 may store the changed data in a memory (not shown) within an OIS driver integrated circuit (IC) as well.

According to an embodiment, when the OIS module supports a function of changing a minimum value and maximum value of a Hall voltage, the processor 110 may store the changed (or converted) OIS Hall calibration data additionally to the existing OIS Hall calibration data. According to an embodiment, when the OIS module does not support the function of changing the minimum value and maximum value of the Hall voltage, the processor 110 may store the changed (or converted) OIS Hall calibration data in place of the existing OIS Hall calibration data.

According to an embodiment, in operation 450, the processor 110 may identify a changed OIS actuator slope. According to an embodiment, to identify the changed OIS actuator slope, the processor 110 may determine whether an OIS actuator driving range corresponding to an OIS correction angle has been secured at a code margin position.

Figure 5:
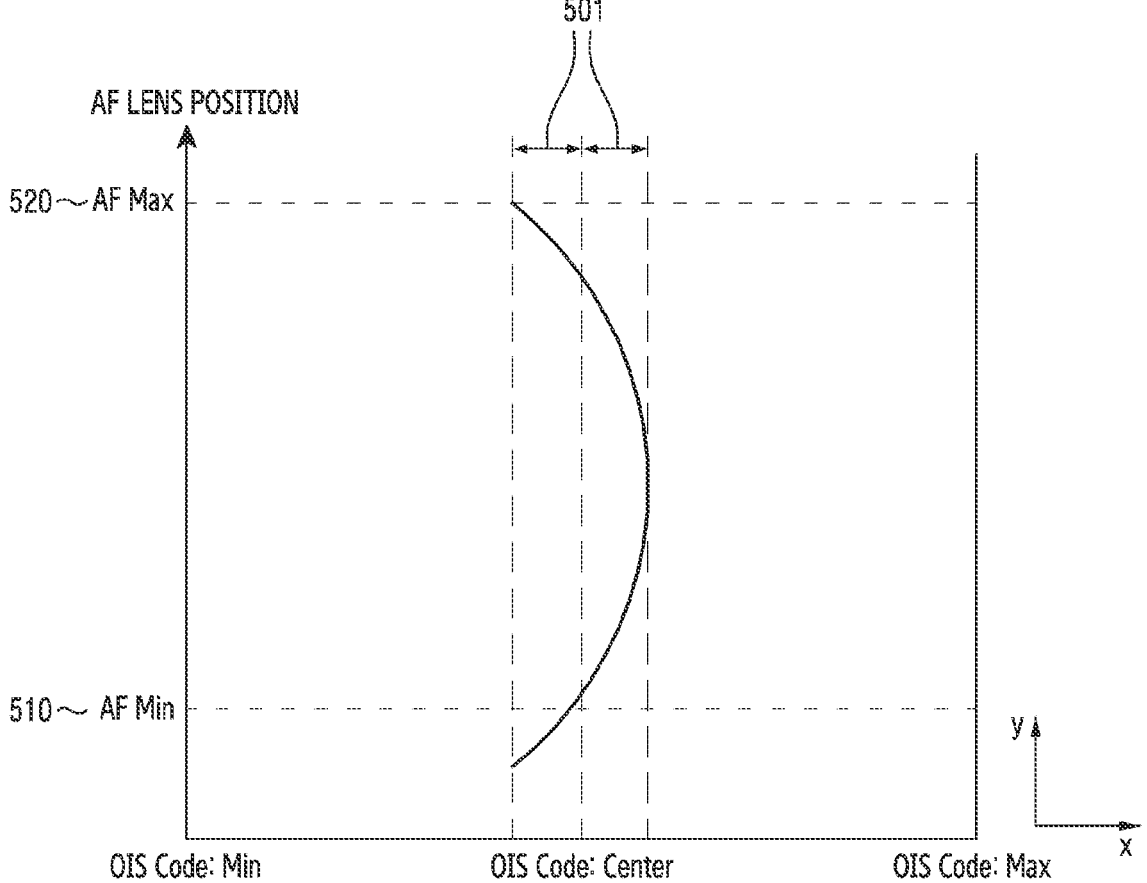
FIG. 5 is a diagram illustrating an OIS error amount that occurs according to the driving of an AF actuator in an electronic device according to various embodiments.

FIG. 5 is a diagram illustrating an OIS error amount occurring according to the driving of an AF actuator in an electronic device according to various embodiments.

Referring to FIG. 5, an X-axis represents an OIS digital code, and a Y-axis represents a position of a lens by driving of the AF actuator. FIG. 5 illustrates an OIS error amount 501 that occurs as the position of the lens by the driving of the AF actuator changes from a first position 510 to a second position 520. For example, the first position 510 may correspond to one end of an AF actuator driving range, and the second position 520 may correspond to the other end of the AF actuator driving range. A value obtained by converting the OIS error amount 501 into a digital code may be referred to as a code margin. According to an embodiment, the processor 110 may determine the OIS error amount (or code margin), based on a movement amount of the lens, which occurs as the AF actuator moves from one end of the AF actuator driving range to the other end, of a direction perpendicular to an optical axis.

Figure 6:
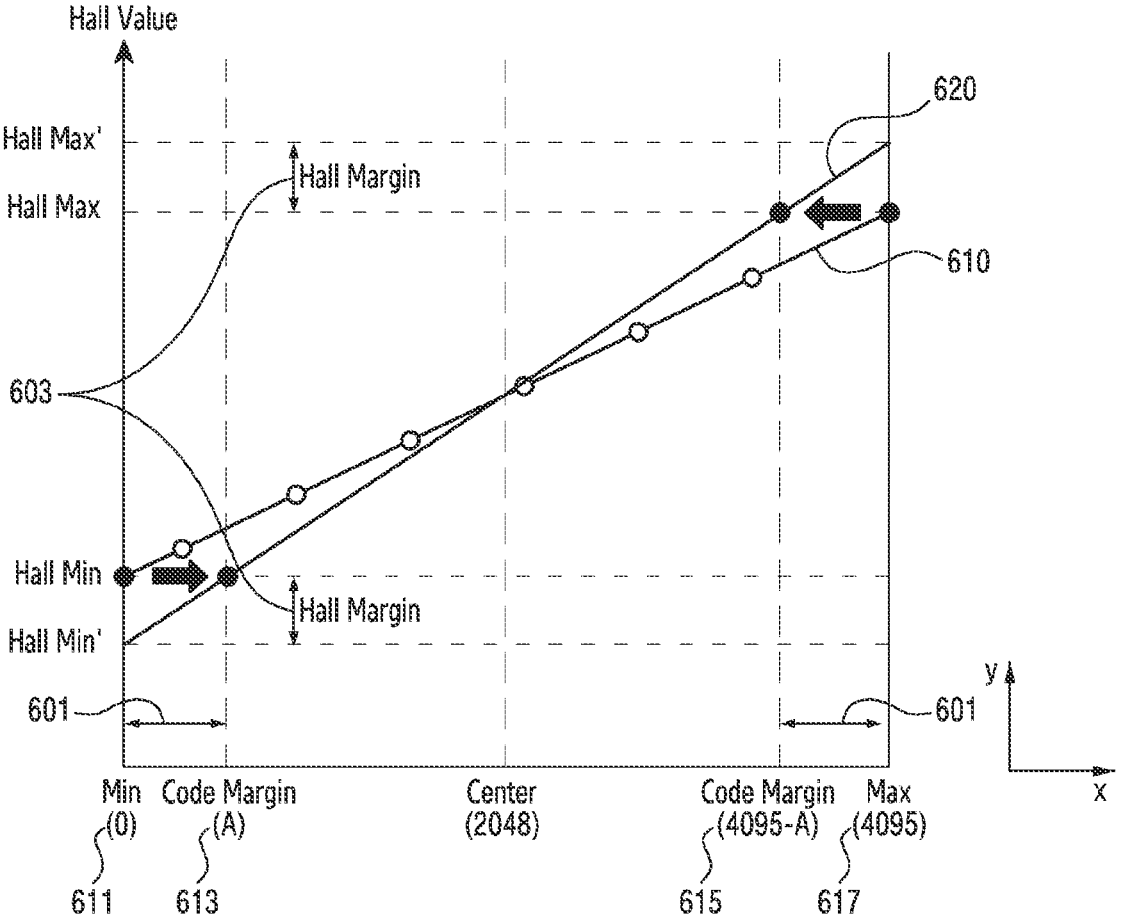
FIG. 6 is a diagram illustrating changing Hall calibration data in an electronic device according to various embodiments.

FIG. 6 is a diagram illustrating changing Hall calibration data in an electronic device according to various embodiments.

Referring to FIG. 6, an X-axis represents an OIS digital code, and a Y-axis represents a Hall voltage value. Also, referring to FIG. 6, it shows first data 610 and second data 620. In this disclosure, the first data 610 may refer, for example to existing Hall calibration data, and the second data 620 may refer, for example, to changed Hall calibration data.

According to an embodiment, the processor 110 may match the first data 610 with a digital code to which a code margin 601 is applied. For example, the first data 610 is to match a minimum value of a Hall sensor with a first value 611 of a digital code (e.g., minimum value of the digital code), in a range of the digital code corresponding to a resolution of an OIS module, and match a maximum value of the Hall sensor with a second value 617 of the digital code (e.g., maximum value of the digital code). The second data 620 is to match the minimum value of the Hall sensor with a third value 613 obtained by adding the code margin 601 to the first value 611 of the digital code (e.g., minimal value of the digital code), in the range of the digital code corresponding to the resolution of the OIS module, and match the maximum value of the Hall sensor with a fourth value 615 obtained by subtracting the code margin 601 from the second value 617 of the digital code (e.g., maximum value of the digital code).

For example, when the resolution of the OIS module is 12 bits, the first data 610 is to match the minimum value of the Hall sensor with the first value 611 (e.g., digital code 0), and match the maximum value of the Hall sensor with the second value 617 (e.g., digital code 4095), and the second data 620 matching with the digital code to which the code margin 601 is applied is to match the minimum value of the Hall sensor with the third value 613 (e.g., value obtained by adding the digital code to the code margin 0), and match the maximum value of the Hall sensor to the fourth value 615 (e.g., value obtained by subtracting the digital code from the code margin 4095). Accordingly, the second data 620 whose minimum value and maximum value of a Hall voltage are changed may be acquired from the first data 610. The minimum value and maximum value of the Hall voltage of the second data 620 are calculated using Equation 1 below.

$$\text{Hall Margin} = \left( \frac{\text{Hall Max} - \text{Hall Min}}{\text{Max Code} - 2 * \text{Code Margin}} * \text{Code Margin} \right) \qquad \text{[Equation 1]}$$

$$\text{Hall Min}' = \text{Hall Min} - \text{Hall Margin}$$

$$\text{Hall Max}' = \text{Hall Max} + \text{Hall Margin}$$

In Equation 1, Hall Max may refer, for example, to a maximum value of a Hall voltage in the first data 610, and Hall Min may refer, for example, to a minimum value of the Hall voltage in the first data 610. Hall Max' may refer, for example, to a maximum value of a Hall voltage in the second data 620, and Hall Min' may refer, for example, to a minimum value of the Hall voltage in the second data 620. Hall Margin may refer, for example, to a difference between the maximum value of the Hall voltage of the first data 610 and the maximum value of the Hall voltage of the second data 620, or a difference between the minimum value of the Hall voltage of the first data 610 and the minimum value of the Hall voltage of the second data 620. Code Margin may refer, for example, to a value obtained by converting an OIS error amount occurring due to AF driving into a digital code, and Max Code may refer, for example, to a maximum code value of a digital code range dependent on a resolution of an OIS module.

According to Equation 1, the maximum value of the Hall voltage of the first data 610 is changed into a value obtained by adding the Hall margin 603 to the maximum value of the Hall voltage of the first data 610. Also, the minimum value of the Hall voltage of the first data 610 is changed into a value obtained by subtracting the Hall margin 603 from the minimum value of the Hall voltage of the first data 610.

When the second data 620 is acquired by changing the Hall calibration data according to Equation 1, the processor 110 may perform OIS in a section that is based on the maximum and minimum values of the Hall voltage of the second data 620.

According to the above-described example embodiment, the electronic device 100 of the disclosure may change Hall calibration data and control a virtual driving section wider than an actual physical driving section, thereby expanding an OIS correction angle.

Figure 7:
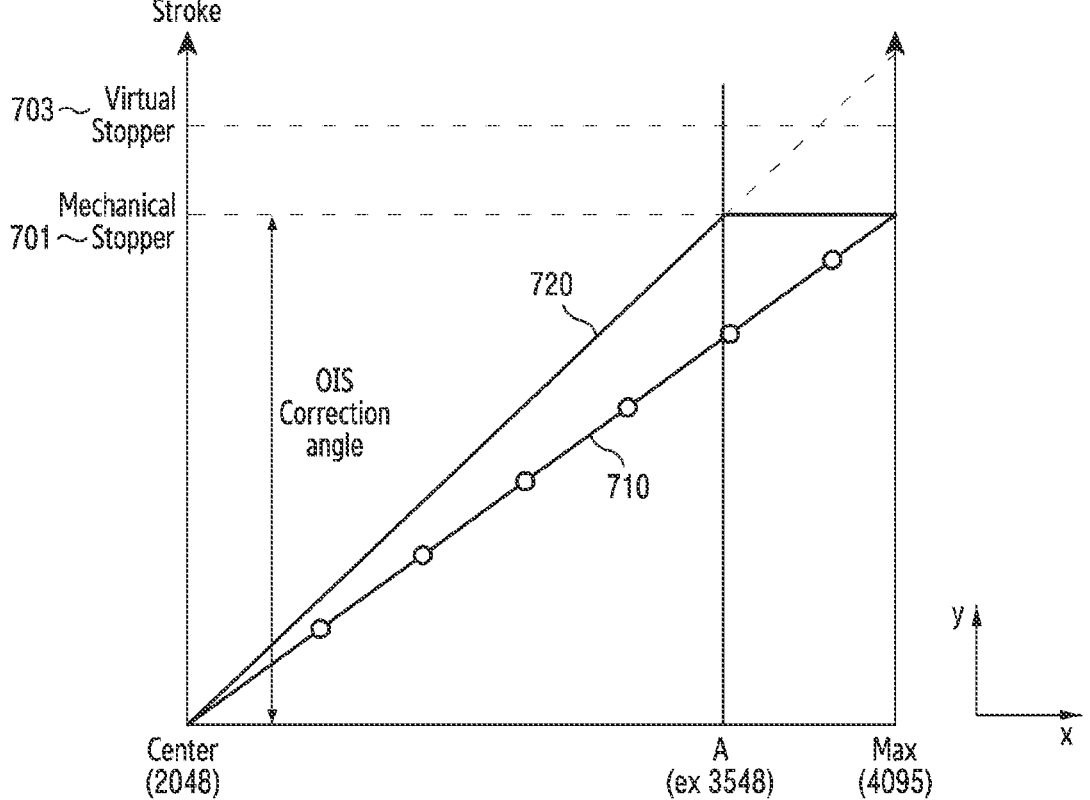
FIG. 7 is a diagram illustrating an OIS actuator driving range corresponding to an OIS correction angle after changing of Hall calibration data in an electronic device according to various embodiments.

FIG. 7 is a diagram illustrating an OIS actuator driving range corresponding to an OIS correction angle after changing of Hall calibration data in an electronic device according to various embodiments.

Referring to FIG. 7, an X-axis represents an OIS digital code, and a Y-axis represents the OIS actuator driving range corresponding to the OIS correction angle. FIG. 7 illustrates third data 710 and fourth data 720. In this disclosure, the third data 710 may refer, for example, to an OIS actuator driving range corresponding to the existing OIS correction angle, and the fourth data 720 may refer, for example, to an OIS actuator driving range corresponding to a changed OIS correction angle.

According to an embodiment, an OIS correction angle may vary as the processor 110 acquires second data (e.g., second data 620 of FIG. 6) by changing existing Hall calibration data (e.g., first data 610 of FIG. 6). In FIG. 7, a change of the OIS correction angle from a center value to a maximum value in a range of a digital code corresponding to a resolution of an OIS module is shown, and a change of the OIS correction angle from a minimum value to the center value also corresponds to this.

For example, the OIS actuator driving range corresponding to the existing OIS correction angle corresponds to a first range 701, and the OIS actuator driving range corresponding to the changed OIS correction angle corresponds to a second range 703 greater than the first range 701.

For example, in an electronic device including an existing OIS module, when a digital code corresponding to a resolution of the OIS module is 0 or 4095, an OIS correction range is limited due to a mechanical stopper, but in the electronic device 100 of the disclosure, when a digital code corresponding to a resolution of an OIS module (e.g., OIS module 130 of FIG. 1) corresponds to sections other than a section of 548 to 3548, an OIS correction range is limited due to the mechanical stopper, so the OIS correction range may be expanded compared to the electronic device including the existing OIS module.

For example, in the same digital code section (e.g., 548 to 3548), the OIS correction range of the electronic device including the existing OIS module may be within a range of 75 percent of a maximum stroke of an OIS actuator, and the OIS correction range of the electronic device 100 of the disclosure may be within a range of 100 percent of the maximum stroke of the OIS actuator.

For example, when a resolution of an OIS module is 12 bits and a stroke of an OIS actuator is 400 μm in the electronic device including the existing OIS module, the resolution of the OIS module may correspond to 400 μm/4096 codes, and when a stroke of an OIS actuator (e.g., driving circuit 103 of FIG. 1) is 400 μm and an OIS code margin is 500 codes in the electronic device 100 of the disclosure, a resolution of an OIS module (e.g., OIS module 130 of FIG. 1) may correspond to 400 μm/3096 codes.

According to the above-described example embodiment, the electronic device 100 of the disclosure may expand an OIS correction range (or correction angle) without an increase of the size of a camera module, by making the OIS correction range compared to the same OIS digital code range in the fourth data 720 to be greater than in the third data 710.

Figure 8:
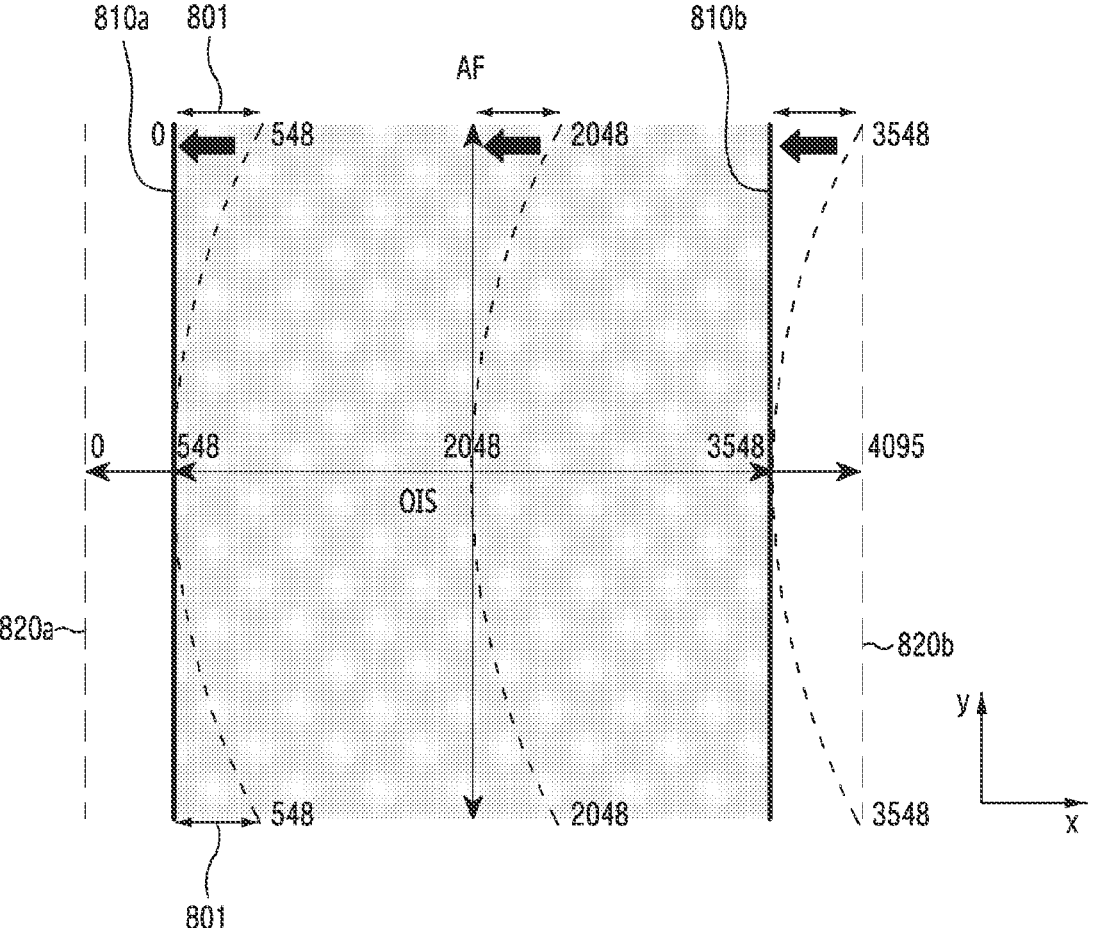
FIG. 8 is a diagram illustrating correcting an OIS section in an electronic device according to various embodiments.

FIG. 8 is a diagram illustrating correcting an OIS section in an electronic device according to various embodiments.

Referring to FIG. 8, an X-axis represents an OIS digital code, and a Y-axis represents a position of a lens by driving of an AF actuator. Referring to FIG. 8, the processor 110 of an embodiment may perform OIS using a determined code margin 801 (e.g., code margin 601 of FIG. 6).

According to an embodiment, as the processor 110 performs OIS using the code margin 801, an OIS actuator driving range may be expanded from a range of a first point 810$a$ to a second point 810$b$ to a range of a third point from 820$a$ to a fourth point 820$b$. The range of the first point 810$a$ to the second point 810$b$ may be referred to as an actual physical driving section, and the range of the third point 820$a$ to the fourth point 820$b$ may be referred to as a virtual driving section.

FIG. 9 is a block diagram illustrating an example electronic device 901 in a network environment 900 according to various embodiments.

Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In various embodiments, at least one of the components (e.g., the connecting terminal 978) may be omitted from the electronic device 901, or one or more other components may be added in the electronic device 901. In various embodiments, some of the components (e.g., the sensor module 976, the camera module 980, or the antenna module 997) may be implemented as a single component (e.g., the display module 960).

The processor 920 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 920 may execute, for example, software (e.g., a program 940) to control at least one other component (e.g., a hardware or software component) of the electronic device 901 coupled with the processor 920, and may perform various data processing or computation. According to an embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901. The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to an embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element including a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mm Wave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In an embodiment, the external electronic device 904 may include an internet-of-things (IOT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 10:
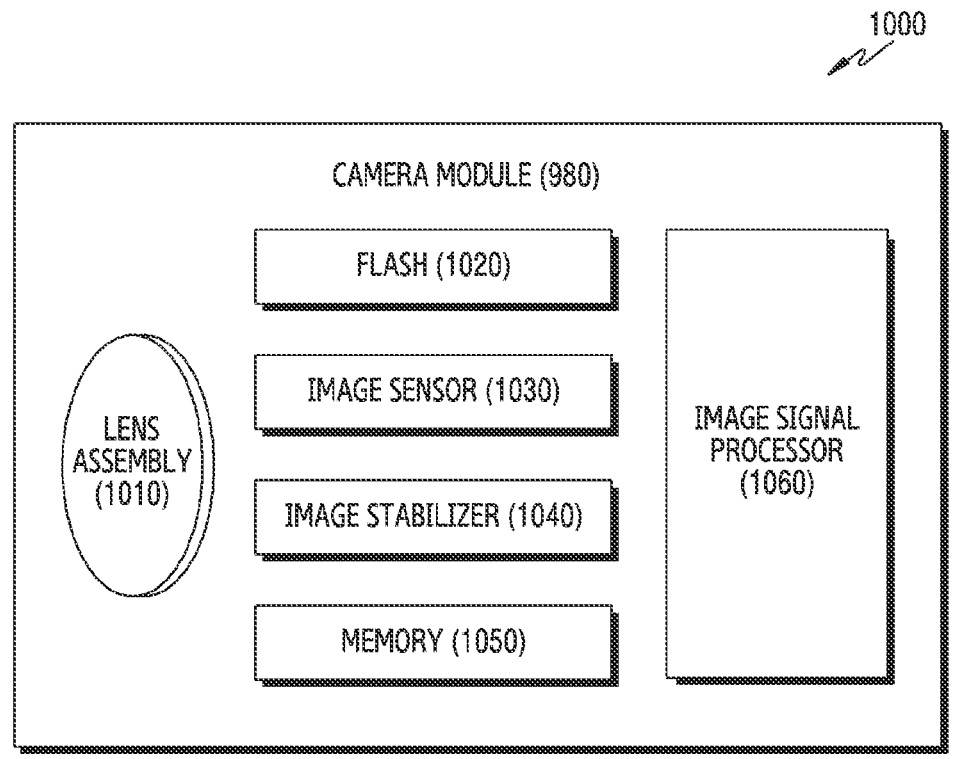
FIG. 10 is a block diagram illustrating an example configuration of a camera module according to various embodiments.

FIG. 10 is a block diagram 1000 illustrating an example configuration of the camera module 980 according to various embodiments. Referring to FIG. 10, the camera module 980 may include a lens assembly (e.g., including at least one lens) 1010, a flash 1020, an image sensor 1030, an image stabilizer 1040, memory 1050 (e.g., buffer memory), and/or an image signal processor (e.g., including processing circuitry) 1060. The lens assembly 1010 may collect light emitted or reflected from an object whose image is to be taken. The lens assembly 1010 may include one or more lenses. According to an embodiment, the camera module 980 may include a plurality of lens assemblies 1010. In such a case, the camera module 980 may form, for example, a dual camera, a 360-degree camera, or a spherical camera. Some of the plurality of lens assemblies 1010 may have the same lens attribute (e.g., view angle, focal length, auto-focusing, f number, or optical zoom), or at least one lens assembly may have one or more lens attributes different from those of another lens assembly. The lens assembly 1010 may include, for example, a wide-angle lens or a telephoto lens.

The flash 1020 may emit light that is used to reinforce light reflected from an object. According to an embodiment, the flash 1020 may include one or more light emitting diodes (LEDs) (e.g., a red-green-blue (RGB) LED, a white LED, an infrared (IR) LED, or an ultraviolet (UV) LED) or a xenon lamp. The image sensor 1030 may obtain an image corresponding to an object by converting light emitted or reflected from the object and transmitted via the lens assembly 1010 into an electrical signal. According to an embodiment, the image sensor 1030 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1030 may be implemented using, for example, a charged coupled device (CCD) sensor or a complementary metal oxide semiconductor (CMOS) sensor.

The image stabilizer 1040 may move the image sensor 1030 or at least one lens included in the lens assembly 1010 in a particular direction, or control an operational attribute (e.g., adjust the read-out timing) of the image sensor 1030 in response to the movement of the camera module 980 or the electronic device 901 including the camera module 980. This allows compensating for at least part of a negative effect (e.g., image blurring) by the movement on an image being captured. According to an embodiment, the image stabilizer 1040 may sense such a movement by the camera module 980 or the electronic device 901 using a gyro sensor (not shown) or an acceleration sensor (not shown) disposed inside or outside the camera module 980. According to an embodiment, the image stabilizer 1040 may be implemented, for example, as an optical image stabilizer. The memory 1050 may store, at least temporarily, at least part of an image obtained via the image sensor 1030 for a subsequent image processing task. For example, if image capturing is delayed due to shutter lag or multiple images are quickly captured, a raw image obtained (e.g., a Bayer-patterned image, a high-resolution image) may be stored in the memory 1050, and its corresponding copy image (e.g., a low-resolution image) may be previewed via the display device 960. Thereafter, if a specified condition is met (e.g., by a user's input or system command), at least part of the raw image stored in the memory 1050 may be obtained and processed, for example, by the image signal processor 1060. According to an embodiment, the memory 1050 may be configured as at least part of the memory 930 or as a separate memory that is operated independently from the memory 930.

The image signal processor 1060 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The image signal processor 1060 may perform one or more image processing with respect to an image obtained via the image sensor 1030 or an image stored in the memory 1050. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1060 may perform control (e.g., exposure time control or read-out timing control) with respect to at least one (e.g., the image sensor 1030) of the components included in the camera module 980. An image processed by the image signal processor 1060 may be stored back in the memory 1050 for further processing, or may be provided to an external component (e.g., the memory 930, the display device 960, the electronic device 902, the electronic device 904, or the server 908) outside the camera module 980. According to an embodiment, the image signal processor 1060 may be configured as at least part of the processor 920, or as a separate processor that is operated independently from the processor 920. If the image signal processor 1060 is configured as a separate processor from the processor 920, at least one image processed by the image signal processor 1060 may be displayed, by the processor 920, via the display device 960 as it is or after being further processed.

According to an embodiment, the electronic device 901 may include a plurality of camera modules 980 having different attributes or functions. In such a case, at least one of the plurality of camera modules 980 may form, for example, a wide-angle camera and at least another of the plurality of camera modules 980 may form a telephoto camera. Similarly, at least one of the plurality of camera modules 980 may form, for example, a front camera and at least another of the plurality of camera modules 980 may form a rear camera.

As described above, an electronic device (e.g., electronic device 100 of FIG. 1) according to an example embodiment may include: a lens assembly (e.g., lens assembly 120 of FIG. 1) including at least one lens aligned along an optical axis, an auto focus (AF) module comprising circuitry (e.g., AF module 150 of FIG. 1) configured to move the lens assembly in the direction of the optical axis, an optical image stabilization (OIS) module comprising circuitry (e.g., OIS module 130 of FIG. 1) configured to move the lens assembly in a plane perpendicular to the optical axis, the OIS module including a unit correction section based on a driving range of the OIS module, a movement range of the lens assembly in the plane dependent on driving of the AF module, and a resolution of the OIS module, an image sensor (e.g., image sensor 160 of FIG. 1) configured to acquire light passing through the lens assembly, a motion sensor (e.g., motion sensor 170 of FIG. 1), and at least one processor, comprising processing circuitry (e.g., processor 110 of FIG. 1), electrically connected to the AF module, the OIS module, the image sensor, and the motion sensor. At least one processor, individually and/or collectively, may be configured to: detect a motion of the electronic device using the motion sensor, drive the image sensor and recognize a subject, control the AF module to move the lens assembly to a first position on the optical axis, based on a position of the subject, and control the OIS module to perform OIS, based on the motion of the electronic device, the first position of the lens assembly, and the unit correction section of the OIS module.

According to an example embodiment, based on the resolution of the OIS module being N bits, the unit correction section may be calculated by dividing a sum of the driving range and the movement range by $2^N$.

According to an example embodiment, the OIS module (e.g., OIS module 130 of FIG. 1) may include a memory, and the unit correction section may be stored in the memory.

According to an example embodiment, the motion sensor (e.g., motion sensor 170 of FIG. 1) may include at least one of an acceleration sensor and a gyro sensor, and at least one processor, individually and/or collectively, may be configured to acquire motion data corresponding to the motion of the electronic device through the motion sensor.

According to an example embodiment, the electronic device (e.g., electronic device 100 of FIG. 1) may further include a Hall sensor, and at least one processor, individually and/or collectively, may be configured to: acquire, through the Hall sensor, a Hall voltage provided from a movement of the lens assembly, and identify the first position of the lens assembly (e.g., lens assembly of FIG. 1) through the Hall sensor.

According to an example embodiment, the driving range of the OIS module (e.g., OIS module 130 of FIG. 1) may be a maximum driving range in which the electronic device may perform OIS.

According to an example embodiment, at least one processor (e.g., processor 110 of FIG. 1), individually and/or collectively, may be configured to acquire at least one image frame on which OIS is performed, through the image sensor.

According to an example embodiment, an actuator of the OIS module (e.g., OIS module 130 of FIG. 1) may be configured to be driven in a ball guide method.

As described above, a method of operating an electronic device (e.g., electronic device 100 of FIG. 1) according to an example embodiment may include: detecting a motion of the electronic device using a motion sensor (e.g., motion sensor 170 of FIG. 1), driving an image sensor (e.g., image sensor 160 of FIG. 1) and recognizing a subject, controlling an auto focus (AF) module (e.g., AF module 150 of FIG. 1) to move a lens assembly (e.g., lens assembly 120 of FIG. 1) including at least one lens along an optical axis to a first position on the optical axis, based on a position of the subject, and performing optical image stabilization (OIS), based on the motion of the electronic device, the first position of the lens assembly, and a unit correction section of an OIS module (e.g., OIS module 130 of FIG. 1), wherein the OIS module may move the lens assembly in a plane perpendicular to the optical axis, and include a unit correction section based on a driving range of the OIS module, a movement range of the lens assembly in the plane dependent on driving of the AF module, and a resolution of the OIS module.

The method of operating the electronic device (e.g., electronic device 100 of FIG. 1) according to an example embodiment may include, based on the resolution of the OIS module (e.g., OIS module 130 of FIG. 1) being N bits, dividing a sum of the driving range and the movement range by $2^N$ and calculating the unit correction section.

The method of operating the electronic device (e.g., electronic device 100 of FIG. 1) according to an example embodiment may include storing the calculated unit correction section in a memory included in the OIS module.

The method of operating the electronic device (e.g., electronic device 100 of FIG. 1) according to an example embodiment may include acquiring motion data corresponding to the motion of the electronic device through the motion sensor (e.g., motion sensor 170 of FIG. 1) including at least one of an acceleration sensor and a gyro sensor.

The method of operating the electronic device (e.g., electronic device 100 of FIG. 1) according to an example embodiment may include acquiring, through a Hall sensor, a Hall voltage provided from a movement of the lens assembly (e.g., lens assembly 120 of FIG. 1), and identifying at least one of a position and direction of the lens assembly through the Hall sensor.

In the method of operating the electronic device (e.g., electronic device 100 of FIG. 1) according to an example embodiment, the driving range of the OIS module (e.g., OIS module 130 of FIG. 1) may be a maximum driving range in which the electronic device may perform OIS.

The method of operating the electronic device (e.g., electronic device 100 of FIG. 1) according to an example embodiment may include acquiring at least one image frame on which OIS is performed, through the image sensor (e.g., image sensor 160 of FIG. 1).

As described above, an electronic device (e.g., electronic device 100 of FIG. 1) according to an example embodiment may include: a lens assembly (e.g., lens assembly 120 of FIG. 1) including at least one lens aligned along an optical axis, an auto focus (AF) actuator configured to move the lens assembly in the direction of the optical axis, an optical image stabilization (OIS) actuator configured to move the lens assembly in a direction perpendicular to the optical axis within a specified driving range, a motion sensor, and at least one processor, comprising processing circuitry, electrically connected to the AF actuator, the OIS actuator, and the motion sensor. At least one processor, individually and/or collectively, may be configured to acquire a movement range of the lens assembly of a direction perpendicular to the optical axis according to the movement of the AF actuator from one end to another end of a driving range of the AF actuator, determine a unit correction section of the OIS actuator, based on the specified driving range of the OIS actuator and the acquired movement range, acquire motion data of the electronic device using the motion sensor, drive the AF actuator and move the lens assembly to a first position on the optical axis, based on a position of a subject, and perform OIS, based on the first position of the lens assembly, the determined unit correction section, and the acquired motion data.

According to an example embodiment, the motion sensor (e.g., motion sensor 170 of FIG. 1) may include at least one of an acceleration sensor and a gyro sensor, and at least one processor (e.g., processor 110 of FIG. 1), individually and/or collectively, may be configured to acquire motion data corresponding to the motion of the electronic device through the motion sensor.

According to an example embodiment, the electronic device (e.g., electronic device 100 of FIG. 1) may further include a Hall sensor, and at least one processor (e.g., processor 110 of FIG. 1), individually and/or collectively, may be configured to acquire, through the Hall sensor, a Hall voltage provided from a movement of the lens assembly (e.g., lens assembly of FIG. 1), and identify the first position of the lens assembly through the Hall sensor.

According to an example embodiment, the electronic device (e.g., electronic device 100 of FIG. 1) may include an image sensor (e.g., image sensor 160 of FIG. 1), and at least one processor (e.g., processor 110 of FIG. 1), individually and/or collectively, may be configured to acquire at least one image frame on which OIS is performed, through the image sensor.

According to an example embodiment, the OIS actuator (e.g., driving circuit 103 of FIG. 1) may be configured to be driven in a ball guide method.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a lens assembly comprising at least one lens aligned along an optical axis;

an auto focus (AF) module comprising circuitry configured to move the lens assembly in the direction of the optical axis;

an optical image stabilization (OIS) module comprising circuitry configured to move the lens assembly in a plane perpendicular to the optical axis, the OIS module including a unit correction section based on a driving range of the OIS module, a movement range of the lens assembly in the plane dependent on driving of the AF module, and a resolution of the OIS module;

an image sensor configured to acquire light passing through the lens assembly;

a motion sensor; and at least one processor, comprising processing circuitry, wherein the at least one processor is configured to:

detect a motion of the electronic device using the motion sensor;

drive the image sensor and recognize a subject;

control the AF module to move the lens assembly to a first position on the optical axis, based on a position of the subject; and control the OIS module to perform OIS, based on the motion of the electronic device, the first position of the lens assembly, and the unit correction section of the OIS module.

2. The electronic device of claim 1, wherein, based on the resolution of the OIS module being N bits, the unit correction section is calculated by dividing a sum of the driving range and the movement range by $2^N$.

3. The electronic device of claim 1, wherein the OIS module comprises a memory, and the unit correction section is stored in the memory.

4. The electronic device of claim 1, wherein the motion sensor comprises at least one of an acceleration sensor and a gyro sensor, and the at least one processor is configured to acquire motion data corresponding to the motion of the electronic device through the motion sensor.

5. The electronic device of claim 1, further comprising a Hall sensor, wherein the at least one processor is configured to:

acquire, through the Hall sensor, a Hall voltage provided from a movement of the lens assembly; and identify the first position of the lens assembly through the Hall sensor.

6. The electronic device of claim 1, wherein the driving range of the OIS module is a maximum driving range in which the electronic device performs OIS.

7. The electronic device of claim 1, wherein the at least one processor is configured to acquire at least one image frame on which OIS is performed, through the image sensor.

8. The electronic device of claim 1, wherein an actuator of the OIS module is configured to be driven in a ball guide method.

9. A method of operating an electronic device, the method comprising:

detecting a motion of the electronic device using a motion sensor;

driving an image sensor and recognizing a subject;

controlling an auto focus (AF) module to move a lens assembly comprising at least one lens along an optical axis to a first position on the optical axis, based on a position of the subject; and performing optical image stabilization (OIS), based on the motion of the electronic device, the first position of the lens assembly, and a unit correction section of an OIS module, wherein the OIS module moves the lens assembly in a plane perpendicular to the optical axis, and includes the unit correction section based on a driving range of the OIS module, a movement range of the lens assembly in the plane dependent on driving of the AF module, and a resolution of the OIS module.

10. The method of operating the electronic device of claim 9, comprising, based on the resolution of the OIS module being N bits, dividing a sum of the driving range and the movement range by $2^N$ and calculating the unit correction section.

11. The method of operating the electronic device of claim 10, comprising storing the calculated unit correction section in a memory of the OIS module.

12. The method of operating the electronic device of claim 9, comprising acquiring motion data corresponding to the motion of the electronic device through the motion sensor comprising at least one of an acceleration sensor and a gyro sensor.

13. The method of operating the electronic device of claim 9, comprising:

acquiring, through a Hall sensor, a Hall voltage provided from a movement of the lens assembly; and identifying at least one of a position and direction of the lens assembly through the Hall sensor.

14. The method of operating the electronic device of claim 9, wherein the driving range of the OIS module is a maximum driving range in which the electronic device performs OIS.

15. The method of operating the electronic device of claim 9, comprising acquiring at least one image frame on which OIS is performed, through the image sensor.

* * * * *